United States Patent [19]

Carlson, Jr.

[11] Patent Number: 5,487,683

[45] Date of Patent: Jan. 30, 1996

[54] SNAP-ON COVER FOR TELECOMMUNICATIONS CONNECTOR BLOCK

[75] Inventor: Robert C. Carlson, Jr., Torrington, Conn.

[73] Assignee: The Siemon Company, Watertown, Conn.

[21] Appl. No.: 184,544

[22] Filed: Jan. 21, 1994

[51] Int. Cl.⁶ ........................................... H01R 9/22
[52] U.S. Cl. .................................. 439/718; 439/491
[58] Field of Search ........................... 439/532, 540, 439/709, 713, 718, 719, 491

[56] References Cited

U.S. PATENT DOCUMENTS

| | | | |
|---|---|---|---|
| 4,104,703 | 8/1978 | Hotchkiss | 439/718 X |
| 4,550,964 | 11/1985 | Donais et al. | 439/718 X |
| 4,802,210 | 1/1989 | Spencer et al. | |
| 4,891,471 | 1/1990 | Onon et al. | |
| 4,898,550 | 2/1990 | Ayer | 439/718 |
| 5,114,363 | 5/1992 | Mitra | 439/491 |
| 5,312,270 | 5/1994 | Siemon et al. | 439/532 |

FOREIGN PATENT DOCUMENTS

| | | | |
|---|---|---|---|
| 0499410A3 | 8/1992 | European Pat. Off. | |
| 1261289 | 4/1961 | France | 439/491 |
| 62-219737 | 9/1987 | Japan | |
| 8204367 | 6/1984 | Netherlands | 439/491 |
| 0694724 | 7/1953 | United Kingdom | 439/718 |
| 2026781 | 2/1980 | United Kingdom | |

*Primary Examiner*—Khiem Nguyen
*Attorney, Agent, or Firm*—Fishman, Dionne & Cantor

[57] ABSTRACT

A snap-on cover assembly is presented to protect and designate connections made in connector block and bracket assemblies of the type used in the telephonic and related data communications industry. Four resilient latches integral with the one piece snap-on cover are insertable in and form a friction fit with the underside surface of four generally rectangular supporting platforms of a 110 type connector block. Removal of the snap-on cover is accomplished by simply pulling the cover from the connector block, and releasing the latches from frictional engagement with the underside surfaces of the aforementioned supporting platforms of the connector block. The cover of this invention is particularly well suited for snap-lock engagement to well-known type "110" terminal blocks. The covers presented are 50 and 100-pair preferred embodiments. The cover provides protection from unauthorized access and any other undesirable contact with the circuitry. Moreover, a receptacle for snap-in colored or coded tabs is provided for color coding circuitry.

7 Claims, 5 Drawing Sheets

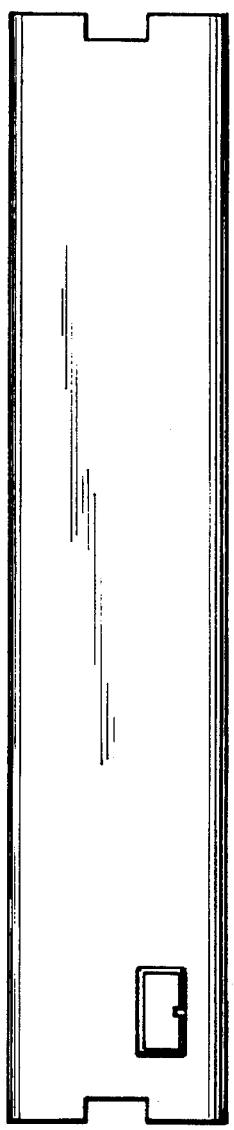
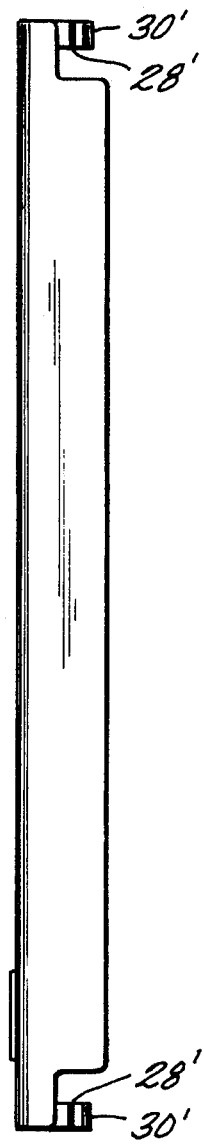
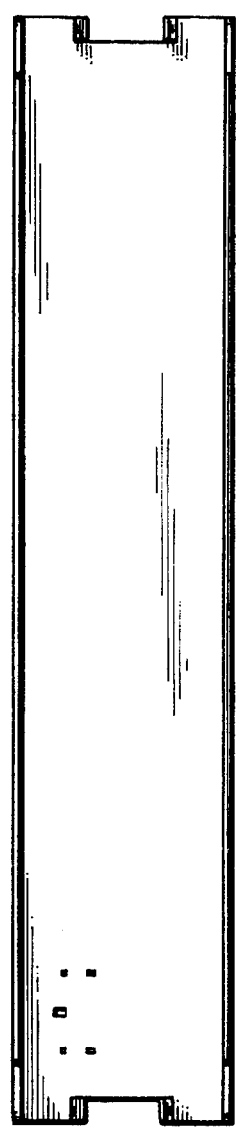
FIG. 10  FIG. 11  FIG. 12
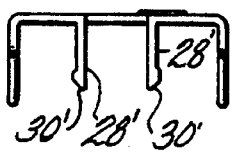
FIG. 13

SNAP-ON COVER FOR TELECOMMUNICATIONS CONNECTOR BLOCK

BACKGROUND OF THE INVENTION

This invention relates to a snap-on cover for a connector block of the type used in the telephonic and related telecommunications and data communications industries. More particularly, this invention relates to a new and improved snap-on cover for mounting on a connector block such as the well known type 110 quick connect block. The snap-on cover of the, present invention provides a surface for labeling circuits and a snap in receptable for colored or coded tabs and additionally provides protection from undesired contact with the circuits.

Protective lids or covers used on connector blocks and the like are well known to those in the telephonic and related arts. These prior art covers are generally comprised of a suitable insulating material, i.e., plastic, and effect protection of the exposed connectors and conductors from shorts and other contact. The covers also serve an important function, as a base for providing labels and other identification of circuitry. Typically, these covers are attached to the block by the manufacturer along one of the longitudinal sides thereof, i.e., one of the sides having a fanning strip. Unfortunately, because the cover is positioned along a fanning strip, the telephone installer encounters interference during installation and wiring of the connector block. Thus, the installer or repair person finds it very difficult to access that fanning strip which is in communication with the cover during a normal wiring or similar procedure. Other types of covers or lids utilize flexible hinge pins inserted in the fanning strip. An example of such a cover is described in commonly assigned U.S. Pat. No. 4,550,964.

Snap-on covers are known for use in connection with well-known type 66 terminal blocks. An example of such a snap-on cover is sold by the Siemon Company of Watertown, Conn. as, for example, catalog number MC4. However, there are presently no snap-on covers of this type suitable for use in connection with a type 110 terminal block and bracket assembly such as is disclosed in U.S. patent application Ser. No. 934,923 filed Oct. 25, 1992 which is assigned to the assignee hereof and incorporated herein by reference. A critical need presently exists for a suitable cover for such "110" blocks.

SUMMARY OF THE INVENTION

The above-discussed and other problems of the prior art are overcome or alleviated by the present invention which comprises a snap-on cover suitable for use with a 110-type terminal block. In accordance with the present invention, a novel cover assembly for conventional connector blocks in the telephonic and related data communications arts is provided which provides protection from unauthorized access to connections; and which easily snap-locks onto well known 110 block and bracket assemblies.

The snap-on cover of the present invention is comprised of a plastic or other insulating material having a pair of depressible latches integral to the cover at each end thereof. These latches effect a removable snap-lock fit to the connector block at each of the four generally rectangular platforms found on the opposed ends thereof and upon which a portion of the cover rests. The pair of latches engage the underside of the aforementioned platforms to retain the cover in position.

The snap-on cover hereinabove described is easily removed by pulling the cover away from the block and defeating the pair of latches at each end. When the snap-on cover is removed, there is total access to every part of the connector block.

When installed, the present invention provides protection from any undesirable contacting or shorting. Adhesive labels may be optionally adhesively applied to both the inside and outside surfaces of the lid and offer quick identification of terminal connections whether on or off the connector block. Covers can also be manufactured from transparent material thus facilitating the maintenance of existing 110 circuit labeling systems while additionally offering protection for the block and the advantage of snap-in color-coding features.

The above discussed and other advantages of the present invention will be apparent to and understood by those skilled in the art from the following detailed description and drawings.

BRIEF DESCRIPTION OF THE DRAWINGS

Referring now to the drawings, wherein like elements are numbered alike in the several FIGURES:

FIG. 10 is a top plan view of the snap-on cover of FIG. 8;

FIG. 11 is a front plan view of the snap-on cover of FIG. 8;

FIG. 12 is a bottom plan view of the snap-on cover of FIG. 8; and

FIG. 13 is an end elevation view of the snap-on cover of FIG. 8.

DESCRIPTION OF THE EMBODIMENT

Figure 1:
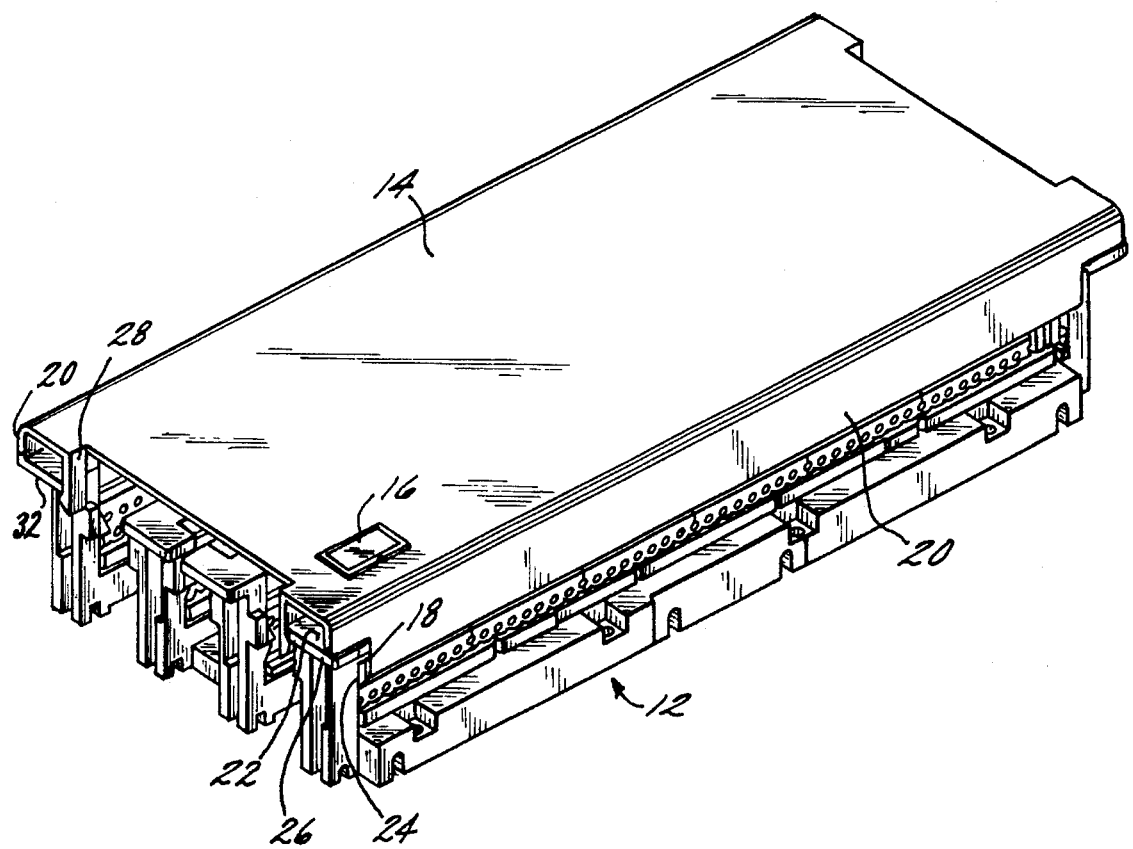
FIG. 1 a perspective view of the snap-on cover (100 pair size) attached to a connector block in accordance with the present invention.
Figure 2:
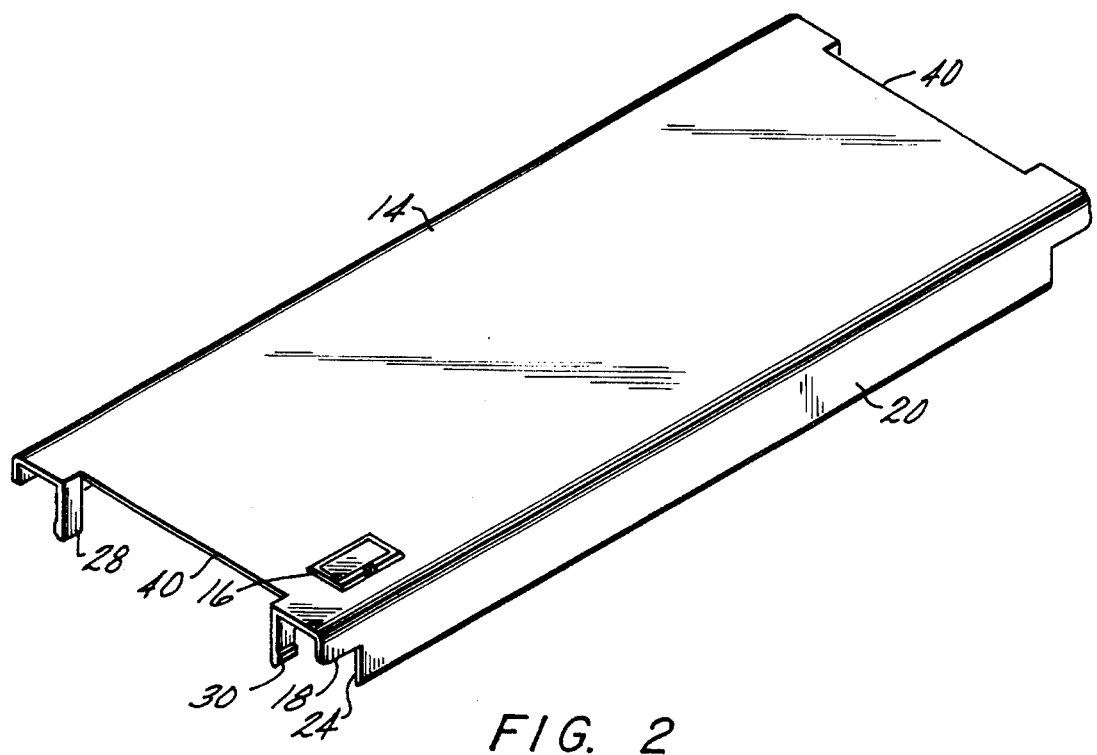
FIG. 2 top perspective view of the snap-on cover (100 pair size) in accordance with the present invention.

Referring first to FIG. 1, the snap-on cover for the connector block in accordance with the present invention is shown generally at 14 and is shown connected to a connector block 12. It should be understood that while the block 12 shown herein is a type "110" terminal block, the snap-on cover 14 may equally be utilized on any similar 110 type connector terminal block and/or bracket assembly.

Referring simultaneously now to FIGS. 1–7, in a first embodiment, the snap-on cover 14 comprises a one piece snap-on planar, flat cover 14 and one of a multiplicity of colored snap-in tabs 16. Snap-on cover 14 is comprised of a suitable electrically insulative material, i.e., plastic, whether opaque translucent or transparent, and has a shape corresponding to the upper surface of the particular connector block to be covered. In the embodiment shown in FIG. 1, snap-on cover 14 has a substantially rectangular shape corresponding to the shape of connector block 12. Snap-on cover 14 has depending sidewalls 20 along the longitudinal sides thereof which provide both further protection against shorting and an extension edge 18 having a height or width less than the height or width of sidewalls 20 so as to allow snap-on cover 14 to rest on a platform 22 of connector block 12. Edge 18 has a length which is just long enough to slip fit over platform 22 and allow a transverse edge 24 to abut the depending side 26 of platform 22. Edge 18 thus supports snap-on cover 14 on platform 22 of connector block 12 while transverse edge 24, when assembled onto connector block 12, comes in contact with sidewall 26 of platform 22 (See FIG. 1) to prevent snap-on cover 14 from sliding off of the platform 22 of connector block 12. Edges 18 and 24 thus define an L-shaped cut-out from the outside corner of each longitudinal sidewall 20. Depending sidewall 20 provides protection along the longitudinal sides of connector block 12 and also adds rigidity to snap-on cover 14. There are two edges 18 and two edges 24 on each end of snap-on cover 14 so as to provide four points of support and four points of retention on four platforms 22 (two on each end) of connector block 12.

Two depending and opposed resilient latches 28 integral with snap-on cover 14 are spaced apart so as to engage two edges 26 of the outside platforms 22 of connector block 12 in opposing directions. The latches 28 extend downwardly from a U-shaped recess 40 centrally located in each opposed end of cover 14. Each latch 28 is disposed across from an edge 18 in a coplanar configuration. At the opposite end of connector block 12, two other latches 28 are similarly engaged on the two outside platforms 22 of connector block 12 in opposing directions. Each latch 28 has an integral rounded detent 30 which flexibly engages the underside surface 32 of platform 22. Thus, the snap-on cover 14 is held securely in place on connector block 12. Removal of the snap-on cover 14 is achieved merely by pulling on the snap-on cover 14 with sufficient force to overcome the engaging force of integral rounded detent 30 on each latch 28. The snap-on cover 14 can be identified by simply snapping in a desired colored or coded snap-in tab 16. Alternatively, a one piece label may be adhesively or otherwise attached to the top or bottom surface of snap-on cover 14 as required.

Figure 3:
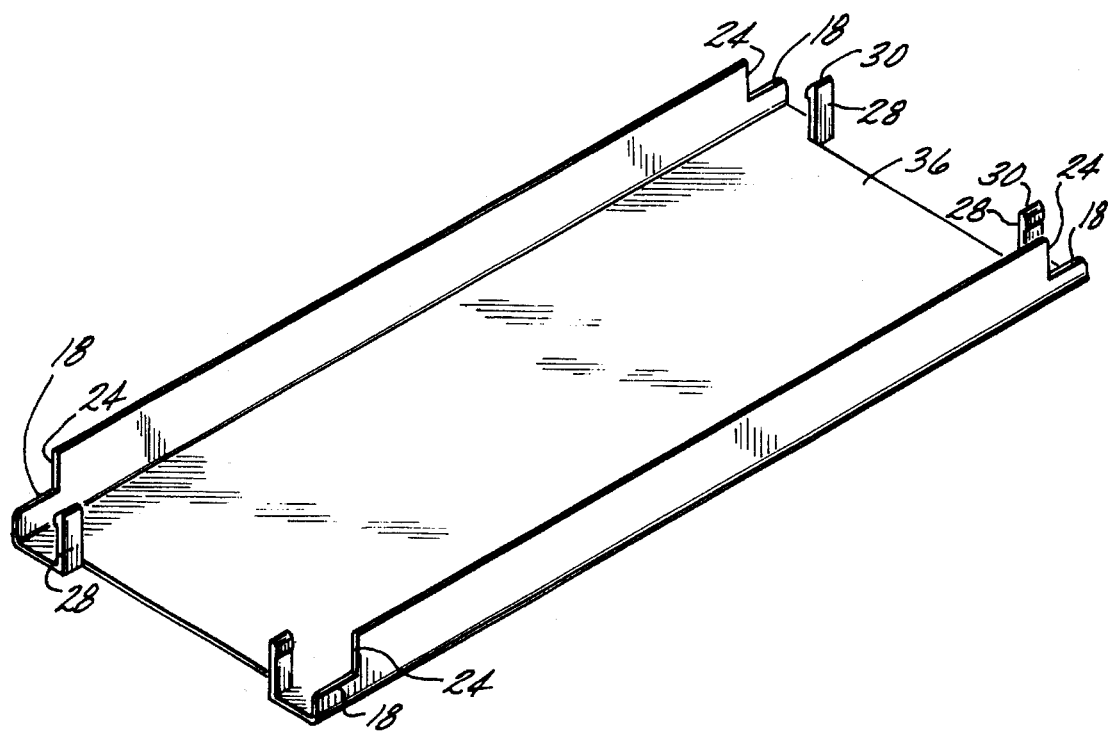
FIG. 3 is a bottom perspective view of the snap-on cover of FIG. 2.

Referring now to FIG. 3, the four latches 28 are clearly shown in this bottom side perspective view of the snap-on cover 14 in accordance with the present invention (100 pair size cover). The backside surface area 36 can be used as a convenient writing area for circuit or function identification or stick-on designation label(s) may be easily and conveniently applied to area 36.

Figure 4:
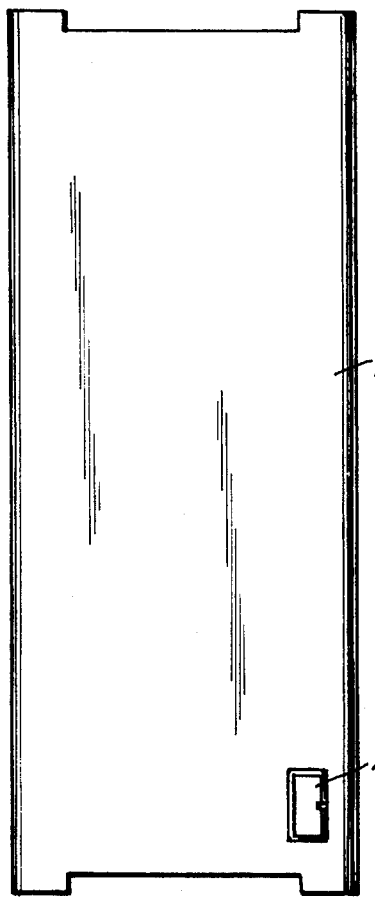
FIG. 4 is a top plan view of the snap-on cover of FIG. 2.
Figure 5:
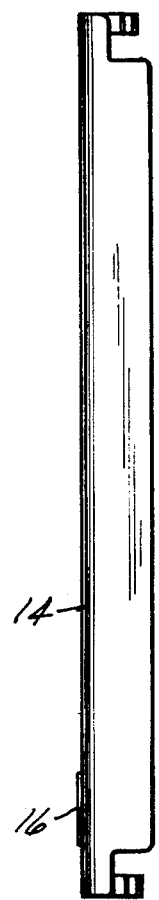
FIG. 5 is a front plan view of the snap-on cover of FIG. 2.
Figure 6:
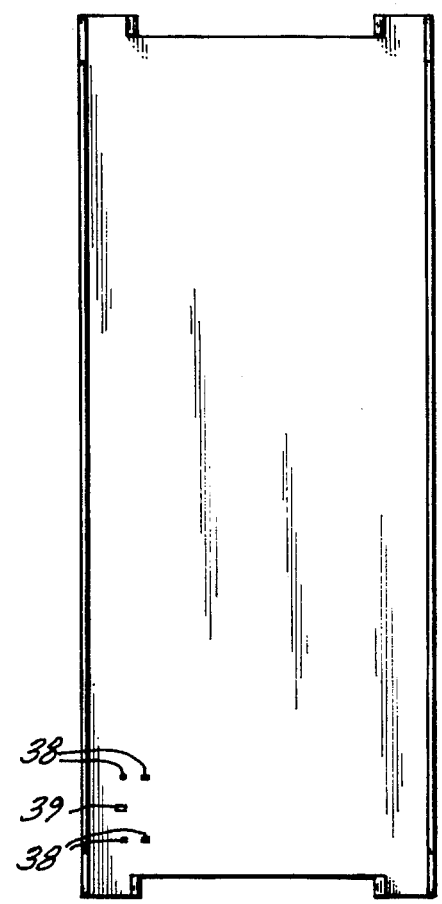
FIG. 6 is a bottom plan view of the snap-on cover of FIG. 2.
Figure 7:
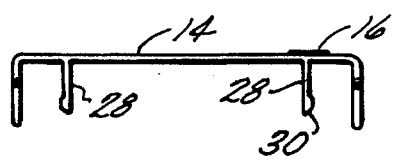
FIG. 7 is an end elevation view of the snap-on cover of FIG. 2.

FIG. 4 is a top plan view of the snap-on cover 14 showing one of a multiplicity of snap-in colored or coded tabs 16. FIG. 6 shows the retention tabs 38 and retention tab 39 as they protrude to the backside of snap-on cover 14. In FIG. 5 it should be noted that the stand-off dimension "A" adapts the cover 14 for use with the well known industry standard "110" series accessories (i.e., voltage protectors) and terminal blocks. For other types of terminal blocks, this stand-off dimension is not required and therefore can be eliminated or varied as required. FIG. 7 is an elevated end view and clearly shows two of the latches 28 and protrusions 30 as they secure the cover to the underside surface 32 of platform 22 of connector block 12 (platform 22 and connector block 12 not shown).

Figure 8:
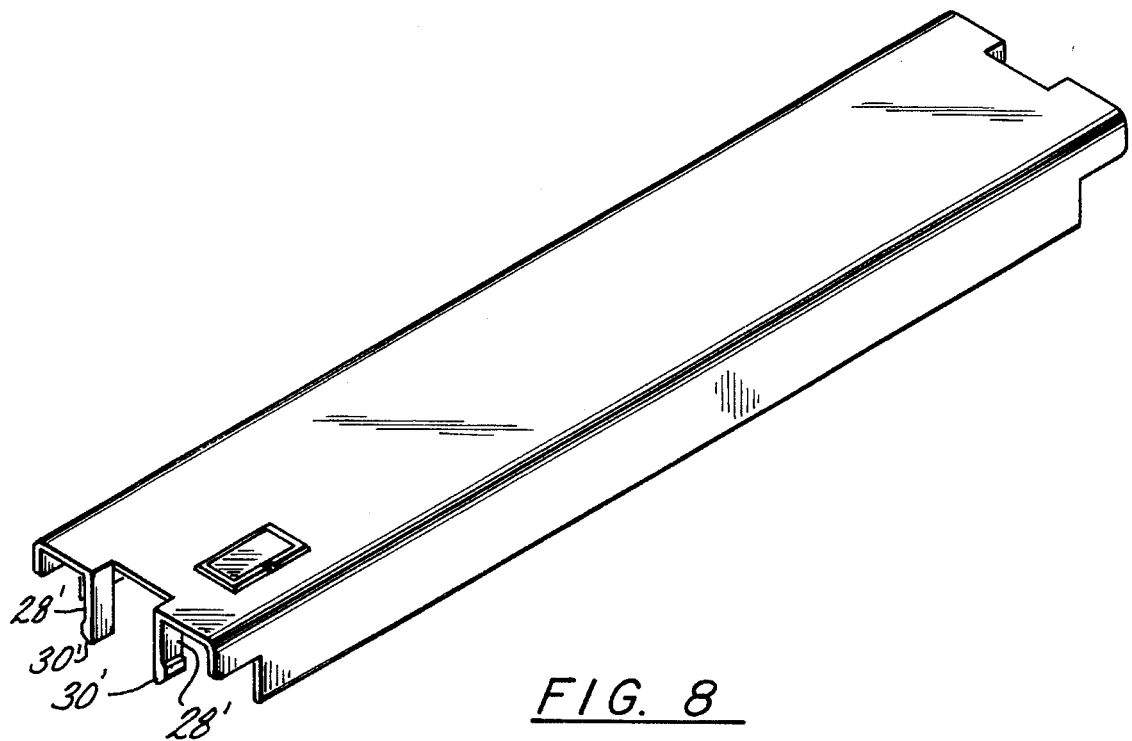
FIG. 8 is a top perspective view of an alternative embodiment (50 pair size) of the snap-on cover of the present invention.
Figure 9:
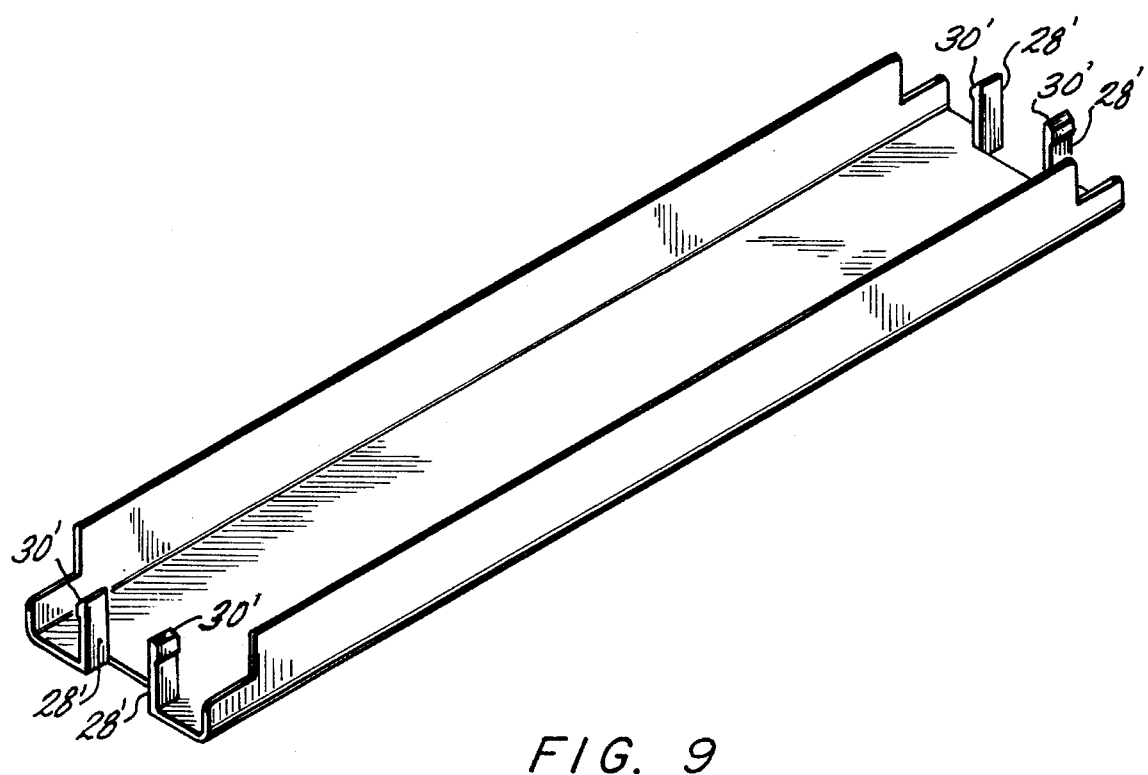
FIG. 9 is a bottom perspective view of the snap-on cover of FIG. 8.

FIGS. 8 and 9 are top and bottom perspective views of an alternative embodiment (50 pair size) of the snap-on cover of the present invention as shown in FIGS. 8–13. Referring to FIGS. 10–13, it can be seen that this alternative cover is similar to the first embodiment (100 pair size) of FIGS. 1–2. The only differences of course, are that the snap-on cover is sized so as to fit onto and cover a 50 pair block. The latches 28' and protrusions 30' are shaped and operate in the same way as in the first 100 pair embodiment.

It will be appreciated that the detachable snap-lock terminal block cover of this invention may be sized and configured for any desired size and is not limited to the 50 or 100 pair configuration.

While preferred embodiments have been shown and described, various modifications and substitutions may be made thereto without departing from the spirit and scope of the invention. Accordingly,, it is to be understood that the present invention has been described by way of illustrations and not limitation.

What is claimed is:

1. A cover for a terminal block comprising:
    a planar cover having opposed first and second ends and opposed first and second longitudinal sides;
    a first sidewall depending downwardly from a first longitudinal side and a second sidewall depending downwardly from a second longitudinal side, each of said sidewalls including two opposed outer corners;
    a cut-out in each of said corners;
    resilient latch means depending downwardly from said planar cover at each of said opposed first and second ends, said latch means being disposed inwardly from, and in spaced alignment with a pair of said cut-outs, whereby, said cover is snap lockable to said terminal block by said resilient latch means engageable with platforms of said terminal block.

2. The cover of claim 1 wherein:
    said cut-outs each have a L-shape.

3. The cover of claim 1 wherein said latch means each comprise:
    a pair of spaced resilient members terminating at a detent with said detent being in facing relation to an adjacent cut-out.

4. The cover of claim 3 including:
    a U-shaped recess centrally located in each opposed end of said planar cover with each of said resilient members defining a parallel branch of said U-shaped recess.

5. The cover of claim 4 including:
    identifying means on said planar cover.

6. The cover of claim 5 wherein:
    said identifying means comprise color coded indicia snap lockable onto a surface of said cover.

7. The cover of claim 1 including a terminal block and bracket assembly, said bracket having a plurality of platforms at each corner thereof which are snap-locked to said latch means and upon which rest said cut-outs.

\* \* \* \* \*